UNITED STATES PATENT OFFICE.

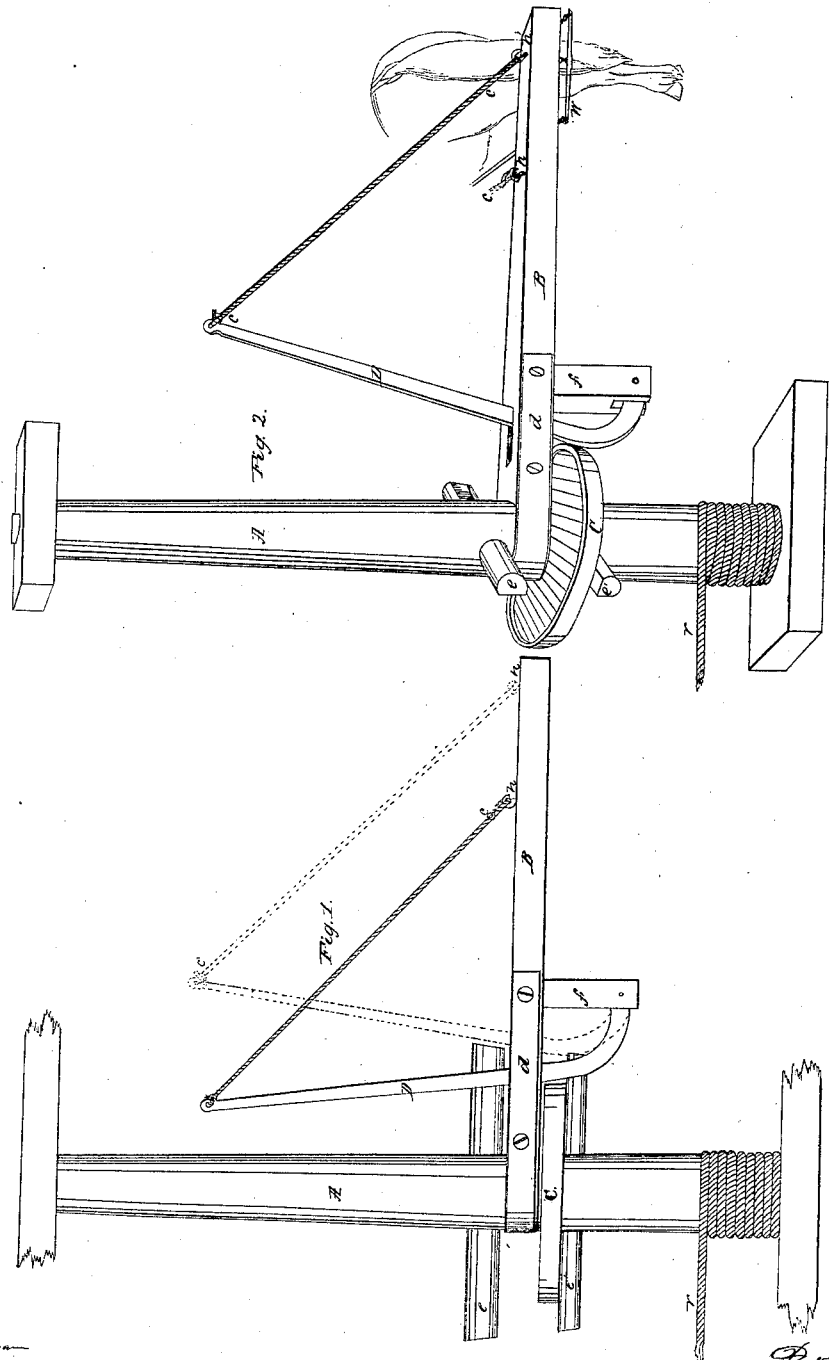

PETER PHILIP, OF GHENT, NEW YORK.

METHOD OF OPERATING WINDLASSES WHEN APPLIED TO HAY-PRESSES, &c.

Specification of Letters Patent No. 24,755, dated July 12, 1859.

*To all whom it may concern:*

Be it known that I, PETER PHILIP, of the town of Ghent, in the county of Columbia and State of New York, have invented a new and useful Improvement on the Sweep and Capstan for Hay and other Presses Where a Sweep and Capstan or Windlass are Used to Transmit the Power to the Press; and I do hereby declare that the following is a full, clear, and exact description of the construction and operation of the same, reference being had to the annexed drawings, making a part of this specification, and to the letters and figures marked thereon, in which—

Figure 1 is a side elevation and Fig. 2, is a perspective view of my invention.

Letter A is the capstan.
Letter B is the boom or sweep.
Letter C is the capstan wheel.
Letter D is the check lever.
Letters $c, c'$ are the lever cord.
Letter $d$ is the boom band embracing the capstan.
Letters $e, e'$ are the two arms or cross bars of capstan.
Letter $f$ is the fulcrum of lever D.
Letters $h, h$, are the hooks or pins for attaching the lever cord.
Letter $r$ is the rope or chain connecting press with capstan.
Letter $w$, Fig. 2, is the whiffletrees.

The nature of my invention consists in providing the ordinary capstan or axle employed for operating hay and other presses with a loose or boom sweep in which the capstan revolves alone or both capstan and boom are made to revolve together when desired, and in the attaching a check lever to the sweep or boom so as to come in contact with two transverse arms or bars passing through the axis of the capstan, one above and one below the sweep, causing both sweep and capstan to revolve together or by a slight change of position relieving the capstan and allowing it to revolve alone while the boom or sweep remains stationary—thus preventing the personal injuries that so frequently occur in the ordinary mode of operating these presses and also the time and labor of unhitching and removing the horse whenever the press is to be run down and hitching him to the sweep again when it is ready to be run up. By means of these improvements and of the wheel which I attach to the capstan immediately beneath the boom and so that the latter rests upon it, the press may be stopped at any time either in running it up or down, the boom operating on this wheel or circular table as a brake.

It is well known that in most hay presses when the sweep and capstan are used to transmit the power to the press, the sweep is fixed firmly into the capstan and the horse or other motive power attached to the end of the sweep—that whenever the hay or other material is sufficiently pressed a dog or brace is used behind the sweep to prevent an uncoil or backward motion, the horse is removed and placed out of the way of the sweep, and as soon as the bale is bound and it is desired to press another, the chain or rope on the capstan must first be uncoiled and the press restored to its original position. To do this, the dog or brace is removed, and the sweep released, which from the weight of the levers and the following of the press, causes it to revolve in its backward sweep with great velocity, prostrating everything that comes within its circuit.

To enable others skilled in the art to make and use my invention I will proceed to describe its construction and operation.

I attach or connect the sweep B with the capstan A somewhat as the boom of a vessel is connected with the mast. I make it movable by passing a strap of iron $d$ around the capstan and attaching each end of it firmly by means of bolts or screws to the sides of the sweep, thus allowing the capstan A to revolve freely within this band while the sweep is at rest. In order to connect this movable sweep, or more properly this free capstan with the boom sweep which is necessary when it is desired to elevate the press, I insert two short transverse bars or arms $e, e'$ through the axis of the capstan A, parallel to each other, one above and one below the boom or sweep B, and in combination with these, and so as to come in contact with them when desired I place the bow lever D in the slot S in the sweep B, supporting its lower end by the fulcrum piece $f$, which is mortised firmly into the lower side of the sweep. This lever D when in the position indicated by the black lines on Fig. 1 is behind the ends of the cross-bars $e, e'$, and when the sweep is revolved as in running the press up, of course carries the capstan around with it.

To regulate the descent of the press and to stop it at any point while being filled I place directly beneath the boom a wheel or circular table, made, when used for hay pressing, of two inch plank, having the capstan A as its axis or center to which it is firmly attached and with which it revolves.

The sweep or boom is made to operate on the wheel or table C as a brake when desired but when the motion of the capstan is reversed as in running it down the boom is elevated a little so as to release the wheel. The cord c attached to the end of this lever when it is in the position last above described, and as represented by letter D Fig. 1, is fastened at its opposite end at h, but when the press is to be run down, the lever will then be in the position indicated by the dotted lines Fig. 1, and the cord and hook by c' and h' respectively. The latter position of the check lever is also shown in the perspective drawing herewith, (Fig. 2.)

I am aware that most of these devices, separately considered, are not new; but combined and arranged in the manner and for the purposes herein described I claim that they constitute a new and valuable improvement on the ordinary mode of constructing hay, cotton and other presses in the security against personal injury and in the saving of time and labor in operating them wherever the sweep and capstan or wheel and axle are employed to transmit the power from the motor to the press.

What I claim and desire to secure by Letters Patent of the United States is—

1. Attaching the wheel or table C to the capstan A so as to be operated upon by the loose or boom sweep B as a brake, for the purpose of stopping the press at any point of descent while being filled, and of regulating and controlling the motion of the capstan in the uncoil.

2. Providing the capstan A with the arms e, e', and the loose or boom sweep B in combination with the check lever D, substantially in the manner and for the purpose herein set forth.

PETER PHILIP.

Witnesses:
ALLEN ROSSMAN,
STEPHEN ROSSMAN.